(12) United States Patent
Rakovski et al.

(10) Patent No.: US 6,215,279 B1
(45) Date of Patent: Apr. 10, 2001

(54) POWER CIRCUIT WITH DOUBLE CURRENT LIMITING

(75) Inventors: Ran Rakovski, Ganey-Tikva; Ofer Zilberberg, Tel Aviv, both of (IL)

(73) Assignee: ADC Telecommunications, Inc., Minnetonka, MN (US)

( * ) Notice: Subject to any disclaimer, the term of this patent is extended or adjusted under 35 U.S.C. 154(b) by 0 days.

(21) Appl. No.: 09/539,018

(22) Filed: Mar. 30, 2000

(51) Int. Cl.[7] .................................................. H01M 10/46
(52) U.S. Cl. ............................................ 320/135; 307/66
(58) Field of Search .................................... 320/103, 110, 320/116, 117, 121, 128, 135, 137; 307/66

(56) References Cited

U.S. PATENT DOCUMENTS 5,664,203 * 9/1997 Hong et al. .
5,977,750 * 11/1999 Ng et al. .

\* cited by examiner

*Primary Examiner*—Edward H. Tso
(74) *Attorney, Agent, or Firm*—Fogg Slifer & Polglaze, PA

(57) ABSTRACT

A method for controlling a power supply is provided. The method includes sensing a total current output by the power supply and sensing a charging current drawn from the power supply by a back-up power source. When the charging current exceeds a selected limit, a signal is provided to reduce the output voltage of the power supply. When the total current of the power supply exceeds a selected limit, a signal is provided to reduce the output voltage of the power supply.

31 Claims, 3 Drawing Sheets

POWER CIRCUIT WITH DOUBLE CURRENT LIMITING

TECHNICAL FIELD

The present invention relates generally to the field of telecommunications and, in particular, to a power circuit with double current limiting.

BACKGROUND

A lot of Emergency equipment must operate even in power failuer situations. This is why telephony systems typically include battery-backed power at the central office or other location on the service provider side of the network. For example, a battery or other power source is coupled in parallel with the power provided from a line voltage.

In recent years, telephony systems have been developed that provide wireless local loops. In these systems, the subscriber equipment includes a radio transmitter connected to the subscriber's telephone and mounted on the subscriber's premises; typically, on an external wall or roof. With a wireless local loop, telephone service is provided to remote subscribers with no physical connection to the telephony network and thus no means for providing power to the subscriber's equipment. A power circuit coupled to a line voltage at the subscriber's premises typically provides power to the equipment. To reduce the chance that the subscriber will lose service due to a loss of line voltage, battery back-up is typically provided for the power circuit. This is also true with respect to solar powered equipment which is typically equiped with battery backup.

Several issues have evolved in the design of power circuits related to providing the battery back up at the subscriber's premises. The first issue is referred to as "deep discharge." When power is lost from the line voltage, the battery provides power to the load, e.g., the telephone, transmitter, and other equipment. As a consequence, the battery discharges over time, i.e., the voltage on the battery reduces with time. If the line voltage is lost for a substantial period of time, the battery voltage may drop significantly. This can damage the battery, e.g., lead acid and nickel cadmium batteries can go "dead" completely. Some power circuits include a low voltage detection circuit that disconnects the battery when the voltage falls below a threshold.

A further issue relates to providing current to charge the battery. The power circuit provides both current to the load and current to charge the battery. If a single power supply is used to provide both the load current and the charging current for the battery, too much current may be provided to the battery. This occurs when the load draws a small portion of its maximum current. In this case, the battery may be severely damaged by the excessive current. Typically, this problem is addressed in power circuits by using two separate power sources. A first power source provides power to the load with high power and constant voltage and a second power source provides power to charge the battery with low power and a constant current. Unfortunately, such power circuits are expensive, complex and consume a large amount of space at the subscriber's premises. Further, these power circuits provide a heavy power drain.

For the reasons stated above, and for other reasons stated below which will become apparent to those skilled in the art upon reading and understanding the present specification, there is a need in the art for an arrangement for providing power to a telecommunications circuit with reduced cost and reduced risk of damage to battery-backed systems.

SUMMARY

The above mentioned problems with providing power to telecommunications circuits and other problems are addressed by the present invention and will be understood by reading and studying the following specification. Embodiments of the present invention limit the current used to charge a back-up power source, e.g., a battery, through a feedback mechanism tied into other feedback controls for the power supply in a single circuit. Further, power consumption and space constraints are limited by using a single power supply to provide power to both the telecommunications circuit and to charge the battery.

More particularly, in one embodiment a method for controlling a power supply is provided. The method includes sensing a total current output by the power supply and sensing a charging current drawn from the power supply by a back-up power source, e.g., batteries. When the charging current exceeds a selected limit, a signal is provided to reduce the output voltage of the power supply. When the total current of the power supply exceeds a selected limit, a signal is provided to reduce the output voltage of the power supply.

DETAILED DESCRIPTION

In the following detailed description, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
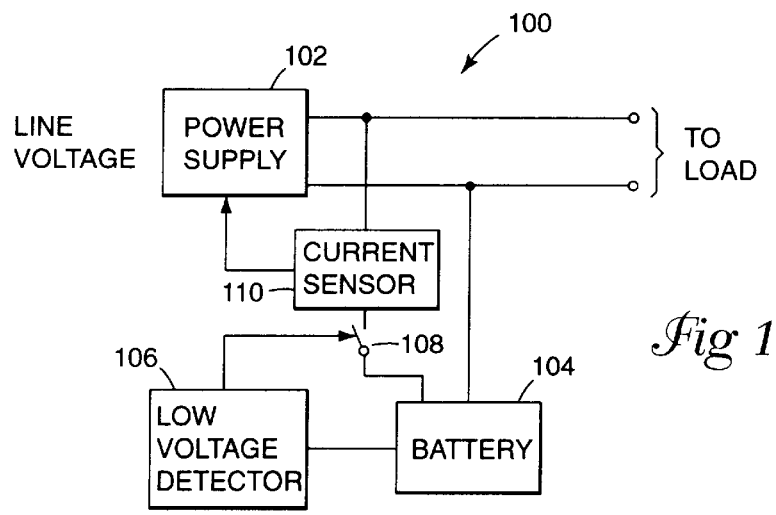
FIG. 1 is a block diagram of an embodiment of a circuit for providing power to a load according to the teachings of the present invention.

FIG. 1 is a block diagram of a power circuit, indicated generally at 100, for providing power to a load, e.g., a telecommunications circuit, according to the teachings of the present invention. Circuit 100 provides power to the load from either power supply 102 or battery 104. Power supply 102 includes an input coupleable to a line voltage. Power supply 102 also includes an output coupleable to the load. Battery 104 is coupled in parallel with the output of power supply 102 via switch 108.

Circuit 100 typically provides power to the load from a line voltage through power supply 102. In the absence of a line voltage, circuit 100 switches to provide power to the load from battery 104. When a line voltage is present, power supply 102 also provides power to charge battery 104, as necessary.

Circuit 100 includes circuitry to protect battery 104 from damage during operation. First, circuit 100 includes low voltage detector 106. Low voltage detector 106 is coupled to battery 104 so as to monitor the voltage level of battery 104.

Low voltage detector 106 is also coupled to switch 108. Switch 108 is coupled between battery 104 and current sensor 110. When low voltage detector 106 detects that the voltage of battery 104 has dropped below a specified level, low voltage detector 106 provides a signal to switch 108 to disable battery 104 from affecting the output of power supply 102. This prevents battery 104 from being damaged by a problem referred to as "deep discharge," i.e., discharging to low, potentially damaging, voltage levels.

Circuit 100 also includes current sensor 110 to prevent damage to battery 104 from high charging current. Current sensor 110 is coupled between switch 108 and the output of power supply 102. Current sensor 110 senses a charging current provided by power supply 102 to battery 104. If the charging current provided by power supply 102 exceeds a specified level, current sensor 110 provides a signal to power supply 102 that effectively limits the current provided to battery 104. In one embodiment, the signal provided to power supply 102 reduces the output voltage of power supply 102 in order to reduce the current provided to battery 104.

In operation, circuit 100 provides power to a load from either a line voltage or battery 104. Circuit 100 also provides a charging current from power supply 102 to battery 104, when necessary. Advantageously, circuit 100 protects battery 104 from both deep discharge and from receiving excessive charging current while using a single power supply to both provide power to the load and to charge the battery.

Low voltage detector 106 protects battery 104 from deep discharge. Low voltage detector 106 monitors the voltage output of battery 104. When the voltage output drops below a specified level, low voltage detector 106 provides a signal to switch 108 to disable battery 104 from affecting the output of power supply 102.

Current sensor 110 protects battery 104 from receiving excessive charging current. Current sensor 110 senses current from power supply 102 provided to battery 104. When the current provided to battery 104 exceeds a selected level, current sensor 110 provides a feedback signal to power supply 102 to reduce the current provided to battery 104. In one embodiment, current sensor 110 provides a signal to power supply 102 that reduces the output voltage of power supply 102 so that the current provided to battery 104 is also reduced.

Figure 2:
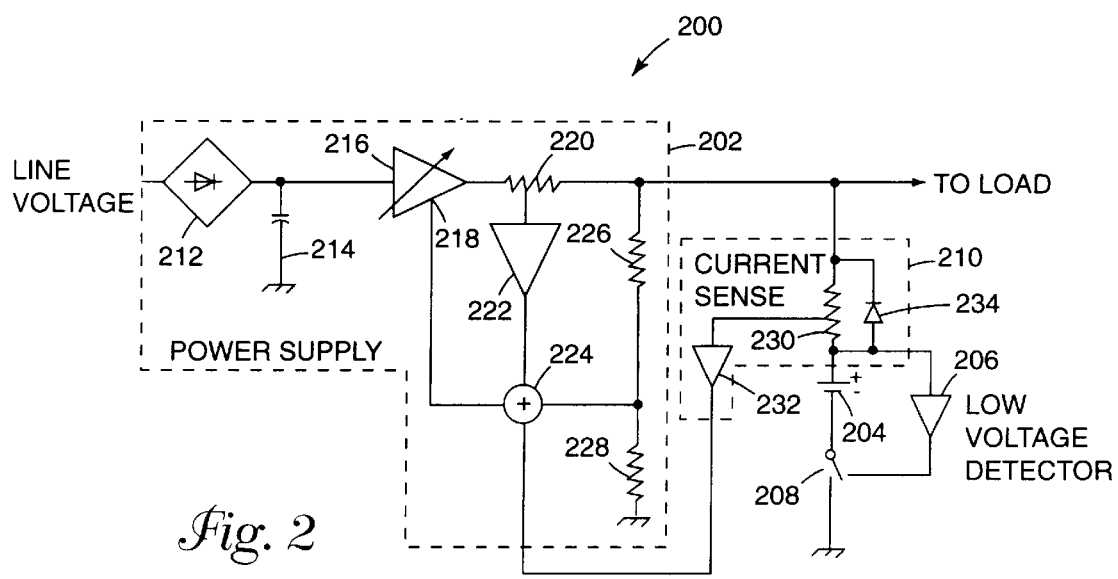
FIG. 2 is an implementation diagram of another embodiment of a circuit for providing power to a load according to the teachings of the present invention.

FIG. 2 is a block diagram of a power circuit, indicated generally at 200, for providing power to a load, e.g., a telecommunications circuit, according to the teachings of the present invention. Circuit 200 provides power to the load from either power supply 202 or battery 204.

Power supply 202 includes an input coupleable to a line voltage. Power supply 202 also includes an output coupleable to the load. Power supply 202 includes rectifier 212 that receives the input from the line voltage. Rectifier 212 is coupled to capacitor 214. Rectifier 212 and capacitor 214 convert the line voltage to a DC voltage. Power supply 202 also includes amplifier 216 that has an input coupled to capacitor 214 and rectifier 212. Amplifier 216 is a variable gain amplifier that receives a feedback signal to control the voltage output of power supply 202. Amplifier 216 includes control input 218 that is coupled to receive feedback signals described in more detail below.

Power supply 202 includes current sense resistor 220 that is coupled to the output of amplifier 216. Current sense resistor 220 senses the total current output of power supply 202. Current sense resistor 220 provides a feedback signal to amplifier 216 via amplifier 222 and summing node 224. The feedback signal from current sense resistor 220 provides an indication to amplifier 216 when the total current output of power supply 202 exceeds a selected threshold. When the total current exceeds the threshold, the feedback signal attempts to reduce the gain of amplifier 216 and thus reduce the output voltage and output current of power supply 202.

Power supply 202 also includes resistors 226 and 228 that provide another feedback signal to amplifier 216 through summing node 224. This feedback signal relates to the output voltage of power supply 202 and attempts to maintain the output voltage at an acceptable level. Resistors 226 and 228 are coupled to form a voltage divider between the output of power supply 202 and ground. The output of the voltage divider is taken between resistors 226 and 228 and provided to amplifier 216 through summing node 224.

Battery 204 is coupled in parallel with the output of power supply 202.

Circuit 200 typically provides power to the load from a line voltage through power supply 202. In the absence of a line voltage, circuit 200 switches to provide power to the load from battery 204. When a line voltage is present, power supply 202 also provides power to charge battery 204, as necessary.

Circuit 200 includes circuitry to protect battery 204 from damage during operation. First, circuit 200 includes low voltage detector 206. Low voltage detector 206 is coupled to battery 204 so as to monitor the voltage level of battery 204. Low voltage detector 206 is also coupled to switch 208. Switch 208 is coupled between battery 204 and ground. When low voltage detector 206 detects that the voltage battery 204 has dropped below a specified level, low voltage detector 206 provides a signal to switch 208 to disable battery 204 from affecting the output of power supply 202. This prevents battery 204 from being damaged by deep discharge.

Circuit 200 also includes current sensor 210 to prevent damage to battery 204 from high charging current. Current sensor 210 is coupled between the output of power supply 202 and battery 204. Current sensor 210 includes sense resistor 230 coupled in series between the output of power supply 202 and battery 204. Diode 234 is coupled in parallel with resistor 230. Current sensor 210 also includes amplifier 232. Amplifier 232 receives a feedback signal from resistor 230 that relates to the charging current for battery 204. Amplifier 232 provides this feedback signal to amplifier 216 through summing node 224.

Current sensor 210 senses a charging current provided by power supply 202 to battery 204. If the charging current provided by power supply 202 exceeds a specified level, current sensor 210 provides a signal to power supply 202 that effectively limits the current provided to battery 204. In one embodiment, the signal provided to power supply 202 reduces the output voltage of power supply 202 in order to reduce the current provided to battery 204.

In operation, circuit 200 provides power to a load from either a line voltage or battery 204. Power supply 202 also provides a charging current to battery 204, when necessary. Advantageously, circuit 200 protects battery 204 from both deep discharge and from receiving excessive charging current while using a single power supply to both provide power to the load and to charge the battery.

Low voltage detector 206 protects battery 204 from deep discharge. Low voltage detector 206 monitors the voltage output of battery 204. When the voltage output drops below a specified level, low voltage detector 206 provides a signal to switch 208 to disable battery 204 from affecting the output of power supply 202.

Current sensor 210 protects battery 204 from receiving excessive charging current. Resistor 230 of current sensor 210 senses charging current from power supply 202 provided to battery 204. When the charging current provided to battery 204 exceeds a selected level, current sensor 210 provides a feedback signal through amplifier 232 and summing node 224 to amplifier 216 to reduce the current provided to battery 204. In one embodiment, current sensor 210 provides a feedback signal to amplifier 216 that reduces the output voltage of power supply 202 so that the current provided to battery 204 is also reduced.

Resistor 220 and amplifier 222 provide a further current limiter for power supply 202. Specifically, resistor 220 monitors the total current from power supply 202. This information is provided in a feedback signal through summing node 224 to amplifier 216 to reduce the output voltage of power supply 202 when the sensed current exceeds a selected level.

Figure 3:
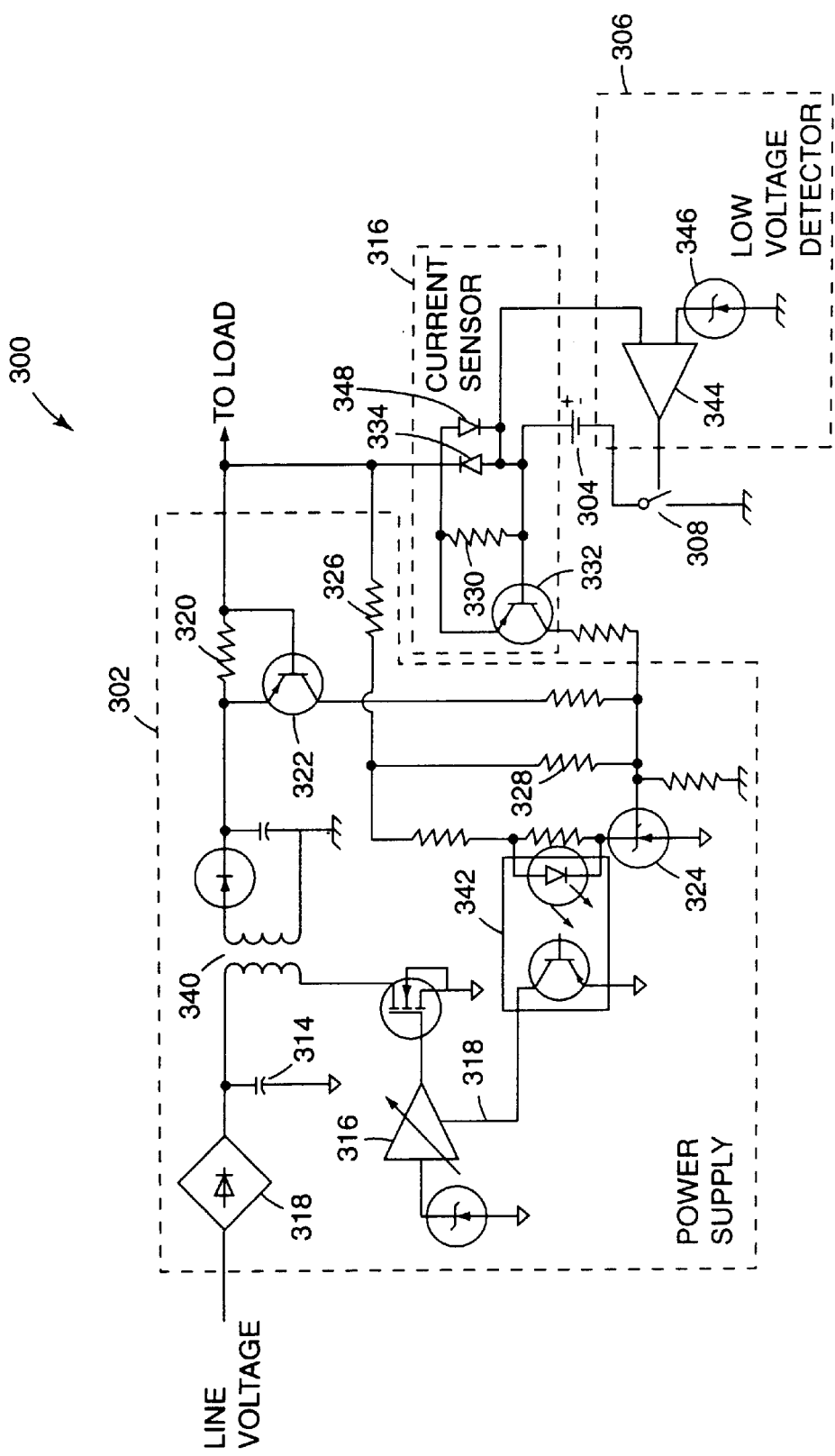
FIG. 3 is a schematic diagram of another embodiment of a circuit for providing power to a load according to the teachings of the present invention.

FIG. 3 is a schematic diagram of a power circuit, indicated generally at 300, for providing power to a load, e.g., a telecommunications circuit, according to the teachings of the present invention. Circuit 300 provides power to the load from either power supply 302 or battery 304.

Power supply 302 includes an input coupleable to a line voltage. Power supply 302 also includes an output coupleable to the load. Power supply 302 includes rectifier 312 that receives the input from the line voltage. Rectifier 312 is coupled to capacitor 314. Power supply 302 also includes amplifier 316. Amplifier 316 and capacitor 314 are both coupled to one side of transformer 340. Rectifier 312, capacitor 314 and transformer 340 combine to convert the line voltage to a DC voltage for the load.

Amplifier 316 is a variable gain amplifier that receives a feedback signal to control the voltage output of power supply 302. Amplifier 316 includes control input 318 that is coupled to receive feedback signals from summing node 324 and optocoupler 342 as described in more detail below. In one embodiment, summing node 324 is implemented using a TL431 circuit commercially available from Texas Instruments Incorporated of Richardson, Tex.

Power supply 302 includes current sense resistor 320 that is coupled to the output of transformer 340. Current sense resistor 320 senses the total current output of power supply 302. Current sense resistor 320 provides a feedback signal to amplifier 316 via amplifier 322 and summing node 324. The feedback signal from current sense resistor 320 provides an indication to amplifier 316 when the total current output of power supply 302 exceeds a selected threshold. When the total current exceeds the threshold, the feedback signal attempts to reduce the gain of amplifier 316 and thus reduce the output voltage and output current of power supply 302.

Power supply 302 also includes resistors 326 and 328 that provide another feedback signal to amplifier 316 through summing node 324. This feedback signal relates to the output voltage of power supply 302 and attempts to maintain the output voltage at an acceptable level. Resistors 326 and 328 are coupled to form a voltage divider between the output of power supply 302 and ground. The output of the voltage divider is taken between resistors 326 and 328 and provided to amplifier 316 through summing node 324.

Battery 304 is coupled in parallel with the output of power supply 302 via bypass diode 334 and switch 308.

Circuit 300 typically provides power to the load from a line voltage through power supply 302. In the absence of a line voltage, circuit 300 switches to provide power to the load from battery 304. When a line voltage is present, power supply 302 also provides power to charge battery 304, as necessary.

Circuit 300 includes circuitry to protect battery 304 from damage during operation. First, circuit 300 includes low voltage detector 306. Low voltage detector 306 includes comparator 344 and reference voltage 346. A first input of comparator 344 is coupled to battery 304 and a second input of comparator 344 is coupled to reference voltage 346. Comparator 344 monitors the voltage level of battery 304 and determines when the voltage drops below a selected level.

Low voltage detector 306 is also coupled to switch 308. Switch 308 is coupled between battery 304 and ground. When low voltage detector 306 detects that the voltage battery 304 has dropped below a specified level, low voltage detector 306 provides a signal to switch 308 to disable battery 304 from affecting the output of power supply 302. This prevents battery 304 from being damaged by deep discharge.

Circuit 300 also includes current sensor 310 to prevent damage to battery 304 from high charging current. Current sensor 310 is coupled between the output of power supply 302 and battery 304. Current sensor 310 includes sense resistor 330 coupled in series between the output of power supply 302 and battery 304. Diodes 334 and 348 are coupled in parallel with resistor 330. Current sensor 310 also includes amplifier 332. Amplifier 332 receives a feedback signal from resistor 330 that relates to the charging current for battery 304. Amplifier 330 provides this feedback signal to amplifier 316 through summing node 324 and optical coupler 342.

Current sensor 310 senses a charging current provided by power supply 302 to battery 304. If the charging current provided by power supply 302 exceeds a specified level, current sensor 310 provides a signal to power supply 302 that effectively limits the current provided to battery 304. In one embodiment, the signal provided to power supply 302 reduces the output voltage of power supply 302 in order to reduce the current provided to battery 304.

In operation, circuit 300 provides power to a load from either a line voltage or battery 304. Advantageously, circuit 300 protects battery 304 from both deep discharge and from receiving excessive charging current while using a single power supply to both provide power to the load and to charge the battery.

Low voltage detector 306 protects battery 304 from deep discharge. Low voltage detector 306 monitors the voltage output of battery 304. When the voltage output drops below a specified level, comparator 344 provides a signal to switch 308 to disable battery 304 from affecting the output of power supply 302.

Current sensor 310 protects battery 304 from receiving excessive charging current. Resistor 330 of current sensor 310 senses current from power supply 302 provided to battery 304. When the current provided to battery 304 exceeds a selected level, current sensor 310 provides a feedback signal through amplifier 332, summing node 324, and optocoupler 342 to amplifier 316 to reduce the current provided to battery 304. In one embodiment, current sensor 310 provides a feedback signal to amplifier 316 that reduces the output voltage of power supply 302 so that the current provided to battery 304 is also reduced.

Resistor 320 and amplifier 322 provide a further current limiter for power supply 302. Specifically, resistor 320 monitors the total current from power supply 302. This information is provided in a feedback signal through summing node 324 and optocoupler 342 to amplifier 316 to reduce the output voltage of power supply 302 when the sensed current exceeds a selected level.

Figure 4:
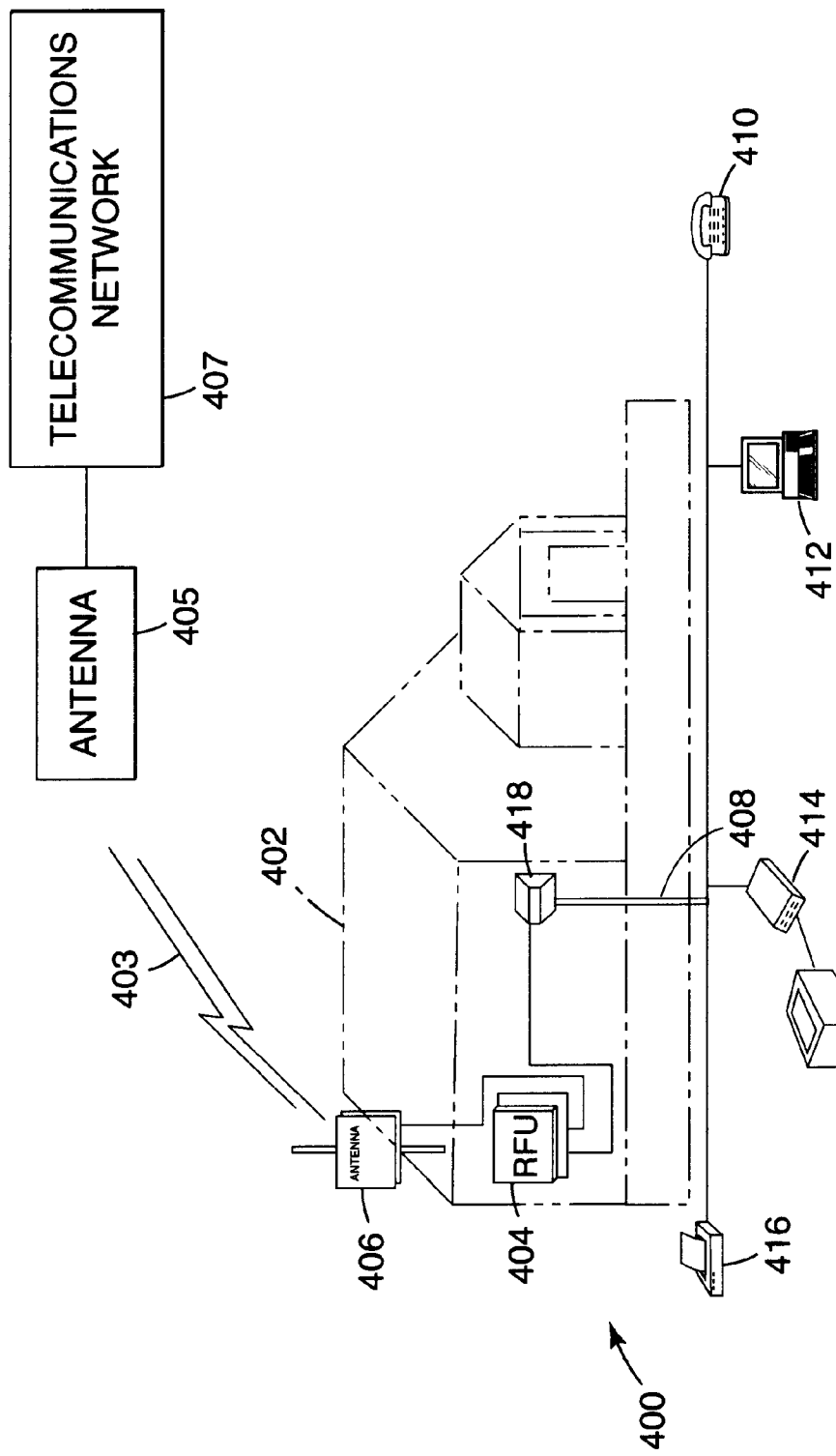
FIG. 4 is an instalation diagram of a telecommunications circuit including a power circuit according to the teachings of the present invention.

FIG. 4 is a block diagram of a telecommunications circuit, indicated generally at 400, constructed according to the teachings of the present invention. Advantageously, telecommunications circuit 400 includes power supply 418 with a back-up battery that is protected from both deep discharge and an excessive charging current. In one embodiment, power supply 418 is constructed as shown and described above with respect to FIGS. 1, 2 or 3.

Telecommunications circuit 400 is installed at a remote subscriber's premises 402 and provides connection to telecommunications network 407 through wireless link 403. Specifically, telecommunications circuit 400 includes radio frequency unit (RFU) 404 that is coupled to antenna 406. RFU 404 communicate with telecommunications network 407 via antenna 406, antenna 405, and wireless link 403. In one embodiment, RFU 404 comprises a StarAccess fixed digital wireless access system commercially available from ADC Teledata of Herzliya, Israel.

RFU 404 is powered by power supply 418. Power supply 418 provides power to RFU 404 from a line voltage when present. Power supply 418 also includes a back-up power source, e.g., a battery, that is used when the line voltage is not operable. Power supply 418 further uses the line voltage to charge the back-up power source. Advantageously, power supply 418 includes circuitry that prevents an excessive current to be provided by the line voltage to the back-up power source. Further, power supply 418 includes circuitry that effectively disables the back-up power source from affecting an output of power supply 418 when the voltage level of the back-up power source falls below a selected level.

RFU 404 is further connected to subscriber equipment through power supply 418 and communication line 408. For example, communication line 408 provides connection to telephone 410, e.g., a POTS, or ISDN telephone, computer 412, modem and printer 414, facsimile machine 416, or any other appropriate communication device.

In operation, telecommunications circuit 400 is powered by power supply 418 to provide communications services between subscriber equipment, e.g., telephone 410, at subscriber's premises 402 and telecommunications network 407. Power supply 418 provides power to telecommunications circuit 400 from either a line voltage or a back-up power source, e.g., a battery. Advantageously, power supply 418 protects its back-up power source from both deep discharge and from receiving excessive charging current while using a single power supply to both provide power to telecommunications circuit 400 and to charge the back-up power source.

CONCLUSION

Although specific embodiments have been illustrated and described in this specification, it will be appreciated by those of ordinary skill in the art that any arrangement that is calculated to achieve the same purpose may be substituted for the specific embodiment shown. This application is intended to cover any adaptations or variations of the present invention. For example, in other embodiments, other mechanisms are used to sense the charging current of the battery. Further, in other embodiments, other mechanisms are used to convert the line voltage to an appropriate DC voltage.

What is claimed is:

1. A method for controlling a power supply, the method comprising:

sensing a total current output by the power supply;

sensing a charging current drawn from the power supply by a back-up power source;

when the charging current exceeds a selected limit, providing a signal to reduce the output voltage of the power supply; and when the total current of the power supply exceeds a selected limit, providing a signal to reduce the output voltage of the power supply.

2. The method of claim 1, and further comprising disabling the back-up power source from affecting the output of the power supply when the voltage level of the back-up power source drops below a selected level.

3. The method of claim 2, wherein disabling the back-up power source comprises generating a control signal for a switch coupled to the back-up power source.

4. The method of claim 1, wherein providing a signal to reduce the output voltage when the charging current exceeds a selected limit comprises providing a signal to a summing node in conjunction with at least one other feedback signal.

5. The method of claim 1, and further comprising:

sensing a voltage output of the power supply; and providing a feedback signal to adjust the output voltage.

6. The method of claim 1, wherein sensing a total current output by the power supply comprises sensing the combination of load current and charging current.

7. A power circuit comprising:

a power supply having an input coupleable to a line voltage and having an output coupleable to a load;

a battery coupled in parallel with the output of the power supply;

a current sensor coupled to the battery to sense a charging current and coupled to the power supply to provide a feedback signal to the power supply to reduce the output voltage of the power supply when the charging current exceeds a selected threshold; and a low voltage detector coupled to the battery that disables the battery from affecting the output of the power supply when the battery voltage is below a threshold.

8. The power circuit of claim 7, wherein the current sensor comprises a resistor coupled in series with the battery.

9. The power circuit of claim 8, wherein the current sensor further includes an amplifier coupled between the resistor and the power supply.

10. The power circuit of claim 7, wherein the power supply comprises a second current sensor that senses total current drawn from the power supply.

11. The power circuit of claim 10, wherein the current sensor and the second current sensor provide feedback signals to an amplifier of the power supply through a common summing node.

12. The power circuit of claim 7, wherein the low voltage detector circuit comprises:

a comparator coupled to the battery and a reference source;

a switch coupled to the battery; and wherein the comparator determines when the voltage of the battery drops below a threshold and turns off the switch to disable the battery from affecting the output of the power supply.

13. A power circuit for a telecommunications circuit, the power circuit comprising:

a power supply having an input coupleable to a line voltage and having an output coupleable to the telecommunications circuit;

a battery, coupled in parallel with the output of the power supply;

a first current sensor, coupled to the output of the power supply, that senses and limits a total current output of the power supply; and a second current sensor, coupled to the battery, that senses and limits a charging current for the battery.

14. The power circuit of claim 13, and further comprising a low voltage detector coupled to the battery that disables the battery from affecting the output of the power supply when the battery voltage is below a threshold.

15. The power circuit of claim 13, wherein the second current sensor comprises a resistor coupled in series with the battery.

16. The power circuit of claim 13, wherein the first current sensor comprises a resistor coupled in series with the output of the power supply.

17. The power circuit of claim 13, wherein the first current sensor and the second current sensor are coupled together at a summing node in a feedback path for the power supply.

18. The power circuit of claim 17, wherein the power supply includes a variable amplifier that receives a feedback signal from the summing node.

19. A power circuit for providing power to a telecommunications circuit, the power circuit comprising:

a power supply having an input coupleable to a line voltage and having an output coupleable to the telecommunications circuit;

the power supply having a feedback path including a summing node;

a first current sense resistor coupled to provide a signal to the summing node that is related to a total current output of the power supply;

a voltage sensing circuit, coupled to the output of the power supply, that provides a second signal to the summing node, the second signal being related to the output voltage of the power supply;

a battery back-up, coupled in parallel with the output of the power supply;

a second current sense resistor coupled to the battery back-up to sense a charging current provided from the power supply to the battery back-up, wherein the second current sense resistor provides a third signal to the summing node; and an output of the summing node providing a feedback signal to control the output voltage of the power supply.

20. The power circuit of claim 19, and further comprising a low voltage detector coupled to the battery back-up that disables the battery from affecting the output of the power supply when the battery voltage is below a threshold.

21. The power circuit of claim 19, wherein the second current sense resister comprises a resistor coupled in series with the battery back-up.

22. The power circuit of claim 19, wherein the first current sense resister comprises a resistor coupled in series with the output of the power supply.

23. The power circuit of claim 19, wherein the power supply includes a variable amplifier that receives a feedback signal from the summing node.

24. A power circuit comprising:

a power supply having an input coupleable to a line voltage and having an output coupleable to a load;

the power supply circuit having a circuit that limits a total current output;

a battery back-up, coupled in parallel with the output of the power supply;

a current sensor coupled to the battery back-up to sense a charging current and coupled to the power supply to provide a feedback signal to the power supply to limit the charging current to below a selected level.

25. The power circuit of claim 24, and further including a low voltage detection circuit that disables the back-up battery from affecting the output of the power supply when the voltage level of the back-up battery falls below a selected level.

26. A telecommunications circuit, comprising:

a radio frequency unit that is operable to provide wireless communication between a telecommunications network and subscriber equipment;

an antenna communicatively coupled to the radio frequency unit; and a power supply circuit, coupled to the radio fiequency unit to provide power to the radio frequency unit, wherein the power supply circuit comprises:

a power supply having an input coupleable to a line voltage and having an output coupled to the radio frequency unit;

a battery, coupled in parallel with the output of the power supply;

a first current sensor, coupled to the output of the power supply, that senses and limits a total current output of the power supply; and a second current sensor, coupled to the battery, that senses and limits a charging current for the battery.

27. The telecommunications circuit of claim 26, and further comprising a low voltage detector coupled to the battery that disables the battery from affecting the output of the power supply when the battery voltage is below a threshold.

28. The telecommunications circuit of claim 26, wherein the second current sensor comprises a resistor coupled in series with the battery.

29. The telecommunications circuit of claim 26, wherein the first current sensor comprises a resistor coupled in series with the output of the power supply.

30. The telecommunications circuit of claim 26, wherein the first current sensor and the second current sensor are coupled together at a summing node in a feedback path for the power supply.

31. The telecommunications circuit of claim 26, wherein the power supply includes a variable amplifier that receives a feedback signal from the summing node.

* * * * *